July 17, 1962  C. C. STONE ET AL  3,045,108
FUEL CONTAINER CLOSURE
Filed Jan. 24, 1961

INVENTORS
Cecil C. Stone
BY Robert A. Noland

Roland A. Anderson
Attorney

3,045,108
FUEL CONTAINER CLOSURE

Cecil C. Stone, Downers Grove, and Robert A. Noland, Chicago, Ill., assignors to the United States of America as represented by the United States Atomic Energy Commission
Filed Jan. 24, 1961, Ser. No. 84,740
4 Claims. (Cl. 219—137)

The invention relates to a method of providing a closure in the end of a tube and, more particularly, to providing by welding a rounded closure on the end of a small thin-walled tube.

Nuclear reactor fuel element containers are desirably thin-walled and of small diameter for reasons of neutron economy and heat transfer, but at the same time they should be gas-tight and mechanically strong in order to contain the dangerously radioactive fission products of the nuclear reaction.

Much difficulty has been experienced in making closures for the ends of fuel rods. Mechanical methods such as swaging, crimping, spinning and the like fail to produce leakproof joints in every case. Seam welding around the perimeter of an end cap where it meets the wall of the tube affects the thin metal of the latter and causes it to have minute leaks in the area below the weld.

Another problem in making closures is to give them desirable flow characteristics. Reactor fuel rods are customarily held together in "bundles" through which the coolant fluid flows; if the ends of the rods are flat or concave, undesirable turbulence is created as the fluid enters and leaves the bundles, and the flow is seriously hampered. A smooth, convex shape is therefore desirable for closures, but this is not always provided due to the expense of machining involved. If such a shape could be provided economically, it would be a worthwhile advance in reactor construction.

It is, accordingly, the object of the invention to provide a strong, gas-tight closure for nuclear fuel elements.

It is another object to provide an economical method for giving such closure a smooth, convex shape which will avoid turbulence at the ends of fuel rod bundles.

Both the foregoing objects are attained by our discovery that closures may be made of virtually prefect convex hemispherical shape by a process of what we call projection welding which will now be described with aid of the figures.

Figure 1:
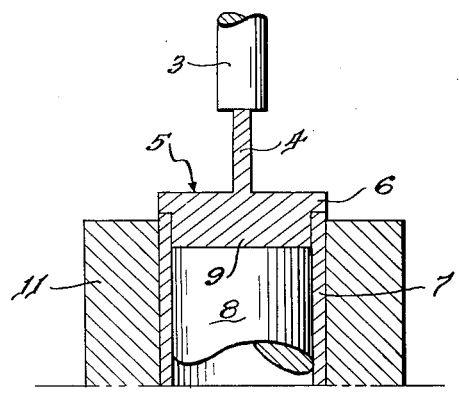
FIGURE 1 is a sectional view of a fuel element just before our process is applied.

Referring to FIGURE 1, 3 is an electrode connected to a direct current power source (not shown). Prior to carrying out the process of the invention, a stationary electrode 3 is in contact as shown with the comparatively narrow central cylindrical projection 4 from end cap 5 which rests on its annular shoulder 6 upon an end of a cylindrical tube 7 of circular section containing a fuel core 8. A base 9 of end cap 5 should fit rather snugly within the tube 7. The core 8 is of the fissionable fuel which may be of the metallic type, the oxide, alloy, dispersion, or any of the other kinds known to the fuel element art.

11 is a cylindrical chill ring of a metal of high heat conductivity such as copper and of much greater comparative thickness than that of wall 7. The chill ring 11 is in intimate physical contact around tube 7. The end of the chill ring 11 should be only slightly below the end of tube 7 in order to permit the shoulder 6 to be welded to the end of the tube 7 and yet to prevent the tube 7 from melting during welding and becoming misshapen.

Figure 2:
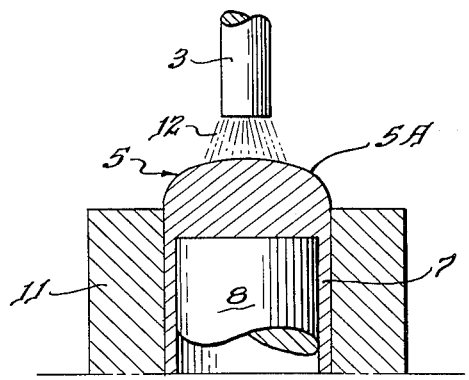
FIGURE 2 is a similar view of the same fuel element after our process has been carried out.

In carrying out the invention, a sufficiently heavy direct current is applied through electrode 3, projection 4, cap 5, tube 7, and chill ring 11 to cause the projection 4 to vaporize sufficiently to make an arc across a gap shown at 12 in FIGURE 2. The arc melts the rest of the projection 4 and the upper part of end cap 5 as well as the end portion of tube 7, and on discontinuance of the current, the chill ring 11 causes the melted metal to congeal, the surface tension of the melted metal causing the end cap 5 to assume a hemispherical surface 5A.

It is believed that the metal forming the surface 5A is derived mainly from end cap 5 and the unvaporized portion of the projection 4, but it is doubtless also contributed to by the end portion of the tube 7. The dimensions shown in the drawings are not necessarily accurate, but are exaggerated for purposes of clarity in illustrating the invention. The annular shoulder 6 on the cap 5 protects the end of the tube 7 from the intense welding heat and keeps it from being burned away.

The invention may be carried out with any of the common metals used for cladding fuel elements such as stainless steel, aluminum, aluminum alloys, zirconium, zirconium alloys, and the like.

The process of the invention should be carried out in an inert atmosphere, such as helium, argon, a vacuum, or the like, as is well known in the art. An enclosing vessel (not shown) may be used for this purpose. It is to be noted that the process of the present invention can be performed in a vacuum, since the arc in this process is produced by vaporized metal. In contrast, conventional arc welding must be carried out in a gaseous atmosphere.

Example I

The tube 7 was of stainless steel and had an outer diameter of 0.176 inch and a wall thickness of 9 mils. The stainless steel was type 304 which consists essentially of 0.08 w/o C, 18.0–20.0 w/o Cr, 8.00–11.00 w/o Ni, 2.00 w/o Mn, and the balance Fe.

The end cap 5 was of the same material and outer diameter as the tube 7 and was pressed into the end of the tube 7 which it fit quite tightly. The end cap 5 was 3/16 of an inch thick, and its annular shoulder 6 was 1/32 of an inch thick and was placed in contact with the end of the tube 7. The projection 4 on the end cap 5 was 1/8 of an inch long and 1/32 of an inch in diameter.

The chill ring 11 was of copper and was placed on the tube 7 so as to expose the end portion thereof to the extent of 1/32 of an inch of the length. The chill ring 11 fits the tube 7 tightly for the sake of good heat transfer and electrical-current flow between them. The electrode 3 was lowered so as to come into firm contact with the projection 4 and then made stationary.

A direct current of 100 amperes was passed through the circuit for 1/30 to 1/20 of a second. The projection 4 vaporized in part and the end cap 5 assumed the virtually perfect hemispherical surface 5A of smooth, machined appearance. During this operation the tube 7 was held vertical, and its upper end was welded to the end cap 5.

The joint between the end cap 5 and the tube 7 was tested for leaks by injecting helium under pressure into the unclosed end of the tube, and then sealing the closed end in a vacuum chamber leading to a mass spectrometer. The spectrometer gave no indication of helium, thus establishing the absence of leaks in the joint between end cap 5 and tube 7. The closure was then sectioned and examined under a metallographic microscope. A sound, metallic structure was observed, free of discontinuities and perforations.

The above welding was carried out in an argon atmosphere and was repeated with a helium atmosphere and with an atmosphere of helium and argon.

Example II

Welding operations like those of Example I were carried out, the tube 7 being held vertical during welding but the end cap 5 being applied to the lower end of the tube 7. The results were satisfactory as in Example I.

It will be understood that this invention is not to be limited to the details given herein, but that it may be modified within the scope of the appended claims.

What is claimed is:

1. A method for closing an end of a tube by welding, comprising placing the tube in a fixed vertical position, inserting in the upper end of the tube a tightly fitting end cap of the same outer diameter as the tube and having a narrow central projection extending upwardly of and away from the tube, the length of the projection being no greater than the diameter of the tube, applying through the tube, end cap and projection a direct electrical current of sufficient magnitude and duration to strike an arc vaporizing a portion of the projection and melt the balance thereof and a part of the end cap and the end of the tube, and simultaneously externally chilling a portion of the tube directly adjacent but slightly spaced from the end of the tube to enable the end cap to be welded to the end of the tube in substantially the shape of a hemisphere of the same diameter as the tube, while preventing the tube from becoming misshapen from welding heat.

2. A method for closing an end of a nuclear reactor fuel tube by welding, comprising placing the tube in a fixed vertical position, inserting in the upper end of the tube a tightly fitting end cap of the same outer diameter as the tube and having an annular shoulder abutting the end of the tube and a narrow central projection extending upwardly of and away from the tube, the length of the projection being about 70% of the diameter of the tube, applying through the tube, end cap and projection a direct electrical current of sufficient magnitude and duration to strike an arc vaporizing a portion of the projection and melt the balance thereof and a part of the end cap and the end of the tube, and simultaneously chilling a portion of the tube directly adjacent but slightly spaced from the end of the tube to enable the end cap to be welded to the end of the tube in substantially the shape of a hemisphere of the same diameter as the tube, while preventing the tube from becoming misshapen from welding heat.

3. A method for closing the end of a tube by welding, the tube of type 304 stainless steel having an outer diameter of .176″ and a wall thickness of .009″, comprising placing the tube in a fixed vertical position, inserting in the upper end of the tube a tightly fitting end cap .1875″ thick of type 304 stainless steel having an annular shoulder .03125″ thick abutting the end of the tube and having the same diameter as the tube, and a projection extending upwardly of and away from the tube, the said projection having a length of .125″ and a diameter of .03125″, applying through the tube, end cap and its projection a direct electric current of 100 amperes from $\frac{1}{30}$ to $\frac{1}{20}$ of a second in an atmosphere selected from the group consisting of argon, helium and a mixture of argon and helium, thereby striking an arc by vaporizing a portion of the projection and making the arc melt the balance thereof and a part of the end cap and the tube end, and simultaneously externally supporting and chilling a portion of the tube directly adjacent but slightly spaced from the said end to enable the shoulder on the end cap to be welded to the end of the tube in substantially the shape of a hemisphere of the same diameter as the tube, and yet to prevent the tube from becoming misshapen from welding heat.

4. The method specified in claim 2, the step of applying electrical current being carried out in a vacuum.

References Cited in the file of this patent

UNITED STATES PATENTS

| | | |
|---|---|---|
| 2,063,671 | Gilpin | Dec. 8, 1936 |
| 2,897,338 | Haynes | July 28, 1959 |
| 2,979,600 | Rangabe | Apr. 11, 1961 |

FOREIGN PATENTS

| | | |
|---|---|---|
| 761,478 | Germany | Oct. 25, 1954 |